(12) United States Patent
Fox

(10) Patent No.: US 7,038,129 B1
(45) Date of Patent: *May 2, 2006

(54) ELECTRICAL OUTLET SAFETY COVER

(76) Inventor: James Fox, 16650 Newport Ct., Brighton, CO (US) 80602

( * ) Notice: Subject to any disclaimer, the term of this patent is extended or adjusted under 35 U.S.C. 154(b) by 0 days.

This patent is subject to a terminal disclaimer.

(21) Appl. No.: 11/057,668

(22) Filed: Feb. 14, 2005

Related U.S. Application Data

(63) Continuation of application No. 10/762,775, filed on Jan. 21, 2004, now Pat. No. 6,855,887.

(51) Int. Cl.
*H02G 3/14* (2006.01)

(52) U.S. Cl. .............................. 174/53; 174/50; 174/67; 220/241; 220/242; 439/135

(58) Field of Classification Search ................ 174/50, 174/48, 53, 57, 58, 66, 67; 220/3.2, 3.3, 220/3.4, 3.5, 3.6, 3.7, 3.8, 3.9, 4.02, 241, 220/242; 439/135, 145, 195, 137, 14, 911; 248/906; 33/528, DIG. 11
See application file for complete search history.

(56) References Cited

U.S. PATENT DOCUMENTS

| | | | | |
|---|---|---|---|---|
| 2,398,901 A | * | 4/1946 | West ........................... | 174/53 |
| 3,061,083 A | * | 10/1962 | Hubbell, Jr. .................. | 174/53 |
| 3,601,276 A | * | 8/1971 | Culpepper .................... | 220/3.4 |
| 4,083,618 A | * | 4/1978 | Busch, Jr. ..................... | 174/67 |
| 4,895,999 A | * | 1/1990 | Calderon ...................... | 174/67 |
| 5,264,662 A | * | 11/1993 | Kennedy ...................... | 174/67 |
| D364,849 S | * | 12/1995 | De Waal ..................... | D13/177 |
| 5,526,952 A | * | 6/1996 | Green ......................... | 220/3.8 |
| 5,639,991 A | * | 6/1997 | Schuette ................. | 33/DIG. 10 |
| 6,372,987 B1 | * | 4/2002 | Ha .............................. | 174/67 |
| 6,452,096 B1 | * | 9/2002 | Childers ....................... | 174/50 |
| 6,520,363 B1 | * | 2/2003 | Sullivan ....................... | 174/66 |
| 6,545,218 B1 | * | 4/2003 | Blaess ......................... | 174/67 |
| 6,576,837 B1 | * | 6/2003 | Pimentel ...................... | 174/58 |
| 6,608,252 B1 | * | 8/2003 | Hurley ........................ | 174/58 |
| 6,649,838 B1 | * | 11/2003 | Lopez et al. .................. | 174/67 |
| 6,669,492 B1 | * | 12/2003 | McIlvenna ................... | 439/135 |
| 6,855,887 B1 | * | 2/2005 | Fox ............................ | 174/53 |

* cited by examiner

*Primary Examiner*—Angel R. Estrada
(74) *Attorney, Agent, or Firm*—Ramon L. Pizarro; Edwin H. Crabtree

(57) ABSTRACT

A safety cover for covering the electrical connectors or connections on the sides of an electrical device, such as an outlet or a switch, during construction is disclosed. The safety cover includes a first panel and a second panel that are spaced apart from one another and connected to one another by a connecting section. A strap or resilient arm is used to retain the safety cover over the electrical device.

8 Claims, 2 Drawing Sheets

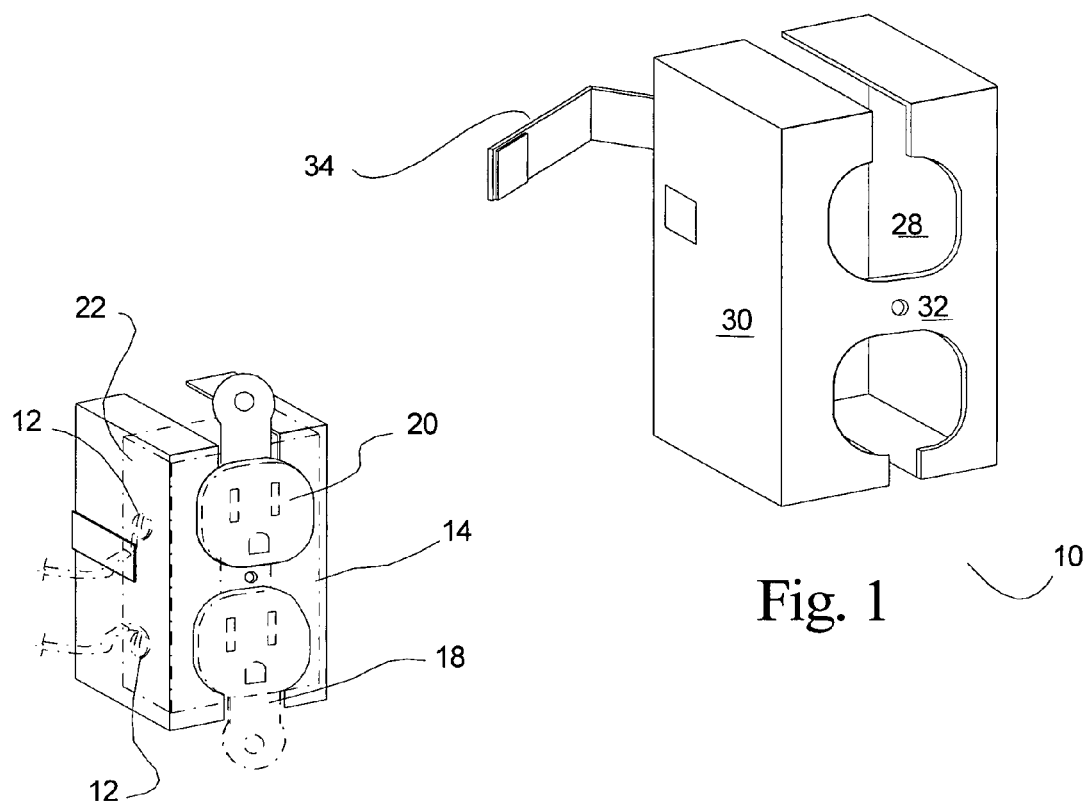
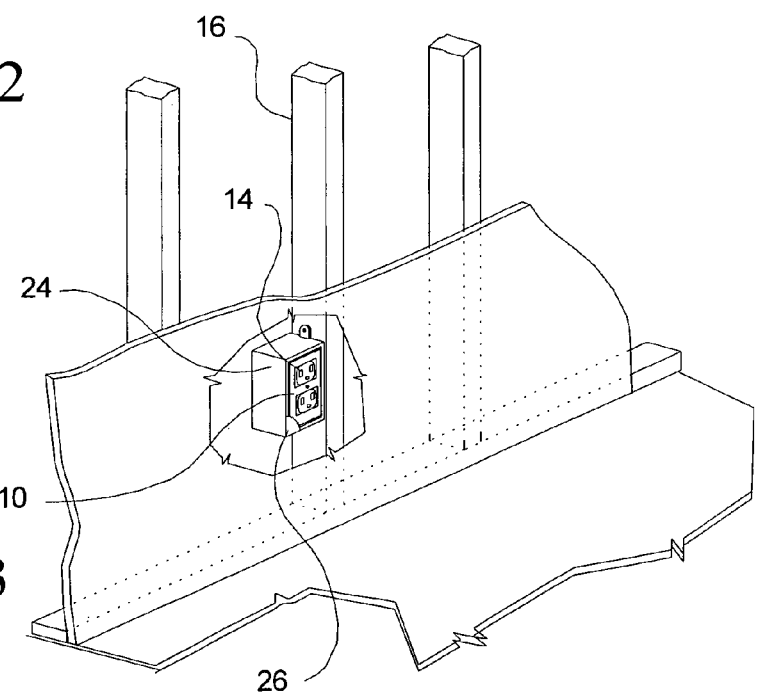
Fig. 1
Fig. 2
Fig. 3

ELECTRICAL OUTLET SAFETY COVER

REFERENCE TO RELATED APPLICATIONS

This application is a continuation of my utility application having Ser. No. 10/762,775, filed Jan. 21, 2004, now U.S. Pat. No. 6,855,887, incorporated herein in its entirety by reference.

BACKGROUND OF THE INVENTION (a) Field of the Invention

This invention generally relates to a cover for protecting individuals from electrical shock. More particularly, but not by way of limitation, to a slip-on enclosure that extends over the wiring connections or connectors, covering the connections or connectors to prevent accidental contact with the connections.

(b) Discussion of Known Art

Construction of commercial or residential structures typically progresses by first erecting the support structure, which includes framing in most residential structures or steel framing for many commercial type structures. After the basic structure is in place, systems such as the electrical and mechanical systems are installed. The installation of the electrical systems includes the installation of electrical outlets. Tradesmen in finishing the structure can use these outlets. However, state and federal regulations limit the stage in the construction process at which these outlets can be used. This limitation is brought about by the requirement that there be no exposed electrical connections in the construction area. Thus, the activation or use of these outlets must be postponed until the electrical connections are concealed, which occurs the finishing work is nearly completed.

Thus, there is a need for a device that can be used to cover electrical connections before finish work is commenced, so that the outlets can be used by tradesmen at early stages of the construction process. The use of the outlets provides a great benefit in that this obviates the need for the use of large extension chords to reach the work area. These extension chords create an injury hazard in that workers may trip over them. Also, the elimination of the cost of carrying, storing, and positioning these extension chords at the job site is a highly desired benefit of the use of the outlets.

Thus, there is a need for a device that can be quickly and easily installed over outlets to cover the electrical connections, eliminating the need to wait until the finish work is substantially completed before using the outlets.

There remains a need for a device that can be positioned over the connections on an electrical outlet, and which allows the use of the outlet before finishing of the structure. Finishing typically encompasses the installation of drywall or other wall surfaces over the box or other structure that holds the electrical to the steel or wooden framing.

There remains a need for a device that can be securely positioned over an electrical outlet with minimal effort, and thus provide the benefit of covering the electrical connections without incurring significant additional cost during construction.

Still further, there remains a need for a cover for the electrical connections of an electrical outlet, which covers the connections that are typically positioned along the sides of the electrical outlet.

SUMMARY

It has been discovered that the problems left unanswered by known art can be solved by providing an electrical outlet or electrical switch safety cover that covers the electrical connectors or connections on the sides of an electrical outlet, the cover includes:

a first panel and a second panel, the first panel being spaced apart from the second panel, the spaced apart panels being connected to one another by a connecting section; and a closure strap, the closure strap having a first end and a second end, the second end of the closure strap having a connector for attaching second end of the closure strap to the second panel, so that the electrical connectors on the sides of the electrical outlet are covered by the first panel and the second panel, and the first panel and the second panel are retained over the electrical connectors by the cooperation of the connecting section and the closure strap when the closure strap is attached to the second panel.

It is contemplated that more than one connecting section may be incorporated into the invention. For example in an embodiment that is particularly well suited for a two-socket outlet, it is contemplated that three connecting sections will extend between the two panels. In this example the two sockets would be accessible between the connecting sections. It is important to note that it is also contemplated that a single connecting section that extends between each of the sockets may also be used.

Alternatively, in an example of an embodiment adapted for use with GFI (ground fault interrupter) equipped sockets, it is contemplated that only two connecting sections would be required, a connecting section would extend above the sockets and a connecting section would extend below the sockets.

Additionally, it is contemplated that the closure strap will be of unitary, one-piece construction with the first panel. Thus according to one example of the invention, only the second end of the closure strap includes a connector for attaching the second end of the closure strap to the second panel. It is contemplated that this connector may be a chemical or mechanical adhesive. Examples of chemical adhesives include glues that may be covered by a peel-away protective cover, or other glues, such as thermoset or thermoplastic materials. Examples of mechanical connectors include snap type connectors, mechanical fasteners such as rivets or bolts, ratcheting type connectors such as are commonly found in cable ties or bag ties, hook and loop type material, as well as devices that incorporate an eye or loop that mates with a peg or other protrusion that would be incorporated into the second panel.

In operation, it is contemplated that the electrical outlet would be mounted from support structure, such as framing, and then connected to the electrical wiring that will deliver electrical power to the outlet. This connection is typically accomplished by creating a stripped section of wire or forming a pig-tail at the end of a stripped section of wire, and then attaching the pig-tail to the outlet through screws that are positioned along the sides of the outlet. Then, the disclosed invention would be positioned over the exposed screws that hold the pig-tails or stripped sections of wire against connectors in the sides of the outlet.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a perspective view of an embodiment of the invention.

FIG. 2 is a perspective view of the example shown on FIG. 1 while mounted over an electrical outlet.

FIG. 3 illustrates the disclosed invention mounted on an electrical outlet, which is in turn mounted on an outlet box supported from the structure's framing.

DETAILED DESCRIPTION OF PREFERRED EXEMPLAR EMBODIMENTS

Figure 4:
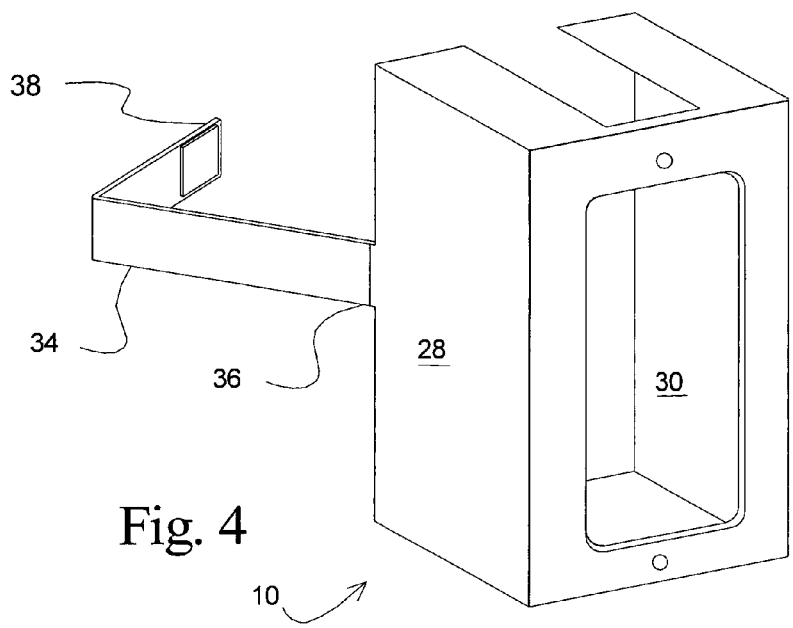
FIG. 4 is an example of the disclosed invention that has been configured for use with an outlet with a GFI device.

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIGS. 1 and 2 it will be understood that disclosed herein is an electrical outlet safety cover 10 for covering the electrical connectors 12 on an electrical outlet 14 that has been mounted on a section of building structure 16. As shown in FIG. 2, the electrical outlet 14 includes a facade 18 with at least one socket 20 adapted for accepting an electrical plug and a pair of sides 22 extending away from the facade 18. At least one of the sides 22 includes an exposed electrical connector 12. It is important to note that what is meant by an "electrical connector 12" includes screws, clips, wires, solder, and other components that makeup the connection that retains the wires and allows current to flow through the electrical outlet 14. Additionally, an "electrical outlet" includes an electrical light switch or similar device.

The electrical outlet safety cover 10 overcomes the problems of known devices in that the disclosed invention provides a secure device and method for protecting workers or individuals working next to the electrical outlet prior to enclosing the outlet with the required finishing materials, such as the outlet box 24 and its corresponding cover 26. The problem associated with potential electrical shock or fire hazard associated with exposed electrical connectors 12 is so severe that many state and federal occupational safety agencies levy significant fines to contractors who activate electrical outlets 14 prior to installing all of the finish covers, such as the cover 26 on the outlet box 24.

Turning to FIGS. 1, 2, 4, and 5, it will be understood that a preferred example of the disclosed invention includes a first panel 28 and a second panel 30. The first panel 28 will be spaced from the second panel 30 at a distance that is approximately equal to the width of the outlet 14. Thus, as shown on FIG. 2, the first panel 28 and second panel 30 are spaced apart at a distance that is slightly larger than the width of the facade 18 of the outlet 14. The length of a connecting section 32, which also connects the first and second panels to one another, defines the spaced apart relationship of first panel 28 and second panel 30. The disclosed invention can use one connecting section 32, as illustrated in FIG. 2, or several connecting sections, as illustrated in FIGS. 1 and 4.

The accompanying drawing show that preferred embodiments of the disclosed electrical outlet safety cover 10 includes a closure strap 34. The closure strap 34 serves to pull or join the first panel 28 to the second panel 30, so that these panels may be retained over and against the electrical connectors 12, to electrical insulate the closure the electrical connectors. Accordingly, the first and second panels should be of a surface are so as to cover the sides or areas on the outlet 14 where the electrical connectors 12 may be exposed.

Turning to FIGS. 4–7 it will be understood that the closure strap 34 includes a first end 36 and a second end 38. It is contemplated that the second end 38 of the closure strap will include a connector 40 for attaching second end 38 of the closure strap 34 to the second panel 30. It is contemplated that the connector 40 may be a chemical adhesive or mechanical joining or connection device. Examples of chemical adhesives include glues that may be covered by a peel-away protective cover, or other glues, such as thermoset or thermoplastic materials. Examples of mechanical connectors include snap type connectors, mechanical fasteners such as rivets or bolts, ratcheting type connectors such as are commonly found in cable ties or bag ties, hook and loop type material, as well as devices that incorporate an eye or loop that mates with a peg or other protrusion that would be incorporated into the second panel 30.

In operation, the user would cover exposed electrical connectors 12 by sliding the safety cover 10 over the outlet 14 such that the first panel 28 and the second panel 30 are slipped over the exposed electrical connectors 12 on the sides 22 of the electrical outlet 14 and are covered by the first panel 28 and the second panel 30. The connecting section 32 of safety cover 10 is pushed and slid over the outlet 14 until the connecting section extends across or approximately across the facade 18. Then, the closure strap 34 is used to secure the safety cover 10 and its first and second panels over the electrical connectors 12. Preferably, the connector 40 will allow the inclusion of some tension force on the closure strap, and thus allow the first and second panels to be pulled tightly against the electrical connectors 12.

Figure 5:
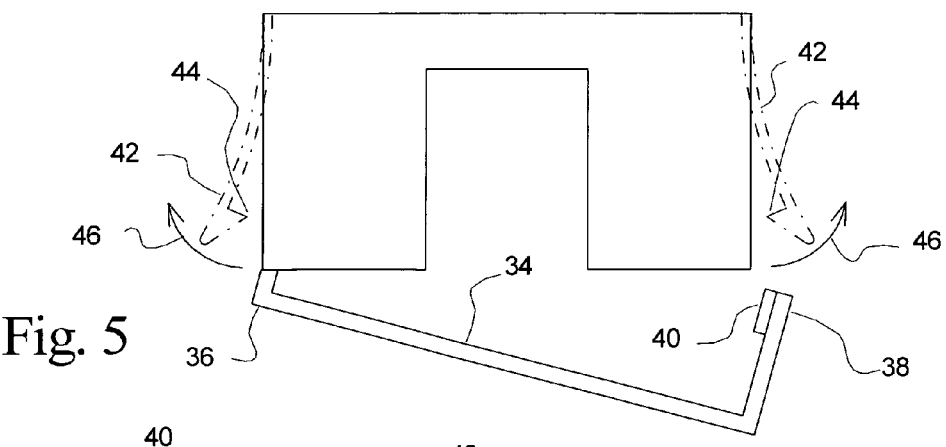
FIG. 5 is a view looking down at an example of the disclosed invention, the view illustrating two different types of mechanisms for mounting the device over an outlet.
Figure 6:
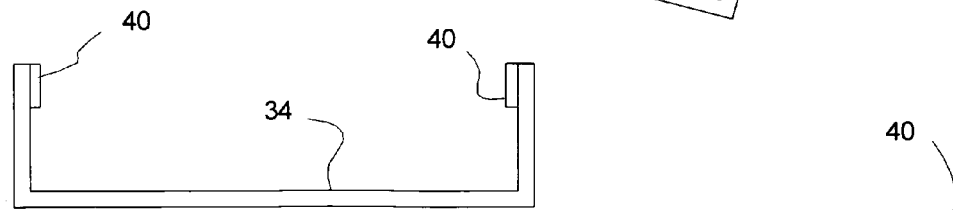
FIG. 6 is a view looking down at an example of a closure strap.
Figure 7:
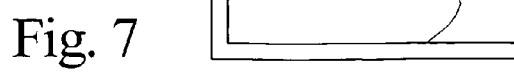
FIG. 7 is a view looking down at yet another example of a closure strap.

As shown on FIG. 5 it is contemplated that the closure strap 34 may be manufactured of integral, one-piece construction with the first panel 28 or the second panel 30. However, it is also contemplated that the closure strap 34 may be separate from the first and second panels, which would permit the manufacture of the closure strap from an elastic material or from the same type of material as the first and second panels. In the example where the closure strap is separate from the first and second panels, both the first end 36 and the second end 38 of the closure strap 34 will include a connector as described above. FIGS. 6 and 7 illustrate examples of the inclusion of the connectors 40 onto the first and second ends of the closure strap 34. FIG. 6 illustrates the use of an adhesive or similar material, such as hook and loop material, in which the mating section of hook and loop material would be mounted on the surface of the first or second panel.

Also shown on FIG. 5 is the use of a resilient gripping arm 42, which may include a gripping barb 44. In this example of the invention the gripping arms 42 and gripping barbs 44 are spaced such that the gripping barbs 44 interfere with the outlet 14, and are thus pushed away in the direction of the arrows 46 by the interference with the outlet 14. Once the gripping arms slide past the body of the outlet 14, they will swing back to their undisturbed position, capturing the outlet 14 between the gripping barbs 44 and the connecting section 32 of the safety cover.

FIG. 7 illustrates the use of a ratcheting mechanism on the first and second ends of the closure strap 34. The ratcheting mechanism includes teeth 42 that mate with a pawl mechanism that would be incorporated into the surfaces of the first panel or second panel. Examples of such types of mechanisms can be found in U.S. Pat. No. 6,347,434, and the references cited therein, all of which are incorporated herein by reference.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A safety cover for covering the electrical connectors on the sides of an electrical switch, the cover comprising:
    a first panel and a second panel, the first panel being spaced apart from the second panel, the first and second panels being connected to one another by a connecting section; and
    a closure strap, the closure strap having a first end and a second end, the second end of the closure strap having a connector for attaching the second end of the closure strap to the second panel, so that the electrical connectors on the sides of the electrical switch are covered by the first panel and the second panel, and the first panel and the second panel are retained over the electrical connectors by the closure strap.

2. A safety cover according to claim 1 wherein said closure strap is of one-piece unitary construction with said first panel.

3. A safety cover according to claim 1 wherein said closure strap is made of an elastic material.

4. A safety cover according to claim 1 wherein said closure strap further comprises a connector on said first end.

5. A safety cover for covering the electrical connectors on the sides of an electrical outlet, the cover comprising:
    a first panel and a second panel, the first panel being spaced apart from the second panel, the first and second panels each having a leading edge and a trailing edge, and the first and second panels being connected to one another by a connecting section that extends from the leading edge of the first panel to the leading edge of the second panel; and
    a resilient gripping arm, the resilient gripping arm extending from the first panel, the resilient gripping arm having a gripping barb that extends from the gripping arm towards the second panel, so that the electrical connectors on the sides of the electrical outlet are covered by the first panel and the second panel, and the first panel and the second panel are retained over the electrical connectors by engagement by the gripping arm.

6. A safety cover according to claim 5 wherein said safety cover comprises a pair of said resilient arms having gripping barbs, one of said resilient arms extending from the first panel with the gripping barb extending towards the second panel and the other resilient arm extending from the second panel towards the first panel.

7. A safety cover according to claim 6 wherein said first panel, said second panel, said connecting section, and said resilient arms are of unitary, one-piece construction.

8. A method for covering the electrical connectors on an electrical device that has been mounted on a section of building structure, the electrical device having a facade with a pair of sides extending away from the facade, at least one of the sides having an exposed electrical connector, the method comprising:
    providing an electrical outlet safety cover for covering the electrical connectors on the sides of an electrical outlet, the cover comprising:
    a first panel and a second panel, the first panel being spaced apart from the second panel, the first and second panels being connected to one another by a connecting section; and
    a resilient gripping arm, the resilient gripping arm extending from the first panel, the resilient gripping arm having a gripping barb that extends from the gripping arm towards the second panel;
    placing the first panel and the second panel over the electrical connectors on the sides of the electrical outlet so that the electrical connectors are covered by the first panel and the second panel and that the connecting section extends across the facade, and retaining the first panel and the second panel over the electrical connectors by engaging the electrical device with the barb that extends from the gripping arm.

* * * * *